Figure 3:
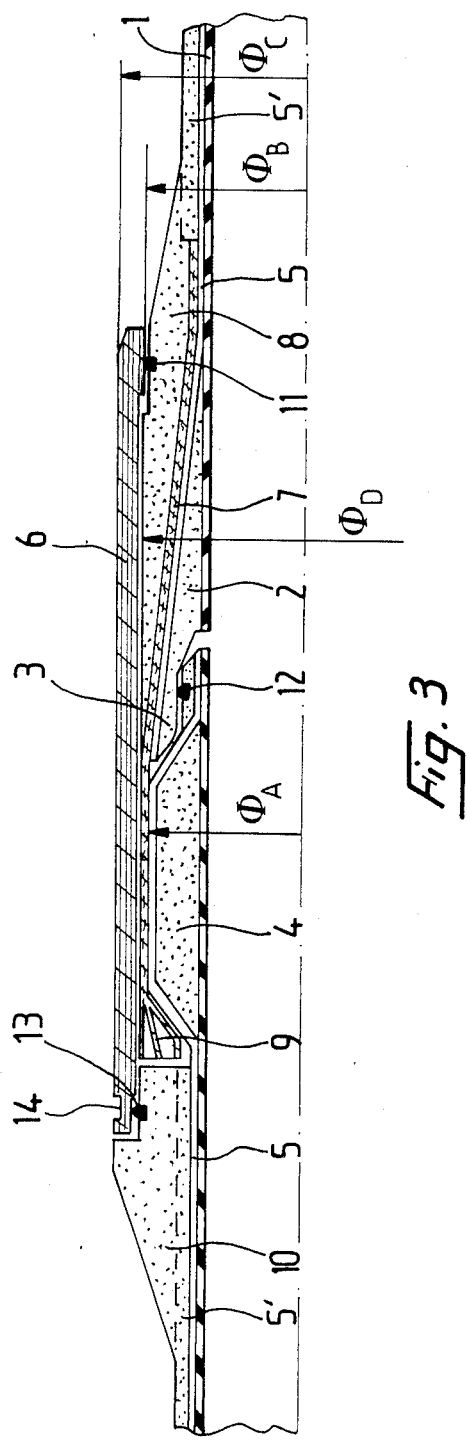

United States Patent [19]
Fuchs

[11] Patent Number: 4,755,406
[45] Date of Patent: Jul. 5, 1988

[54] METHOD OF FORMING A COMPOSITE MATERIAL TUBE CONNECTION AND A CONNECTION DEVICE COMPRISING APPLICATION THEREOF

[75] Inventor: Jean-Francois Fuchs, Castelnau, France

[73] Assignee: Aerospatiale Societe Nationale Industrielle, Paris, France

[21] Appl. No.: 921,188

[22] Filed: Oct. 21, 1986

[30] Foreign Application Priority Data

Oct. 23, 1985 [FR] France ................................ 85 15734

[51] Int. Cl.$^4$ ............................................. B32B 1/08
[52] U.S. Cl. .......................................... 428/36; 138/155; 156/154; 156/171; 156/173; 156/188; 285/423
[58] Field of Search ............... 156/154, 171, 172, 173, 156/188; 285/260, 417, 423; 403/405.1; 428/36; 138/155

[56] References Cited

U.S. PATENT DOCUMENTS

4,440,587  4/1984  Thompson et al. ................. 156/154
4,451,069  5/1984  Melone et al. ........................ 285/86

FOREIGN PATENT DOCUMENTS

EPA 0083972  7/1983  European Pat. Off. .

*Primary Examiner*—Robert A. Dawson
*Attorney, Agent, or Firm*—Armstrong, Nikaido, Marmelstein & Kubovcik

[57] ABSTRACT

The invention provides a method for forming a composite material tube connection.

On a rubber skin 1 are wound inserts 3 and 4 which form the extra thick portions required for snap fitting of the tubes, of the male end piece and of the female end piece, on these inserts and on the current part of the tube fibers 5 are wound circumferentially, on the tube is fitted a sleeve 6 previously formed, on the female end piece are bound strips 7 also formed previously, and a stop heel 10 is formed on the male end piece by a new winding.

11 Claims, 3 Drawing Sheets

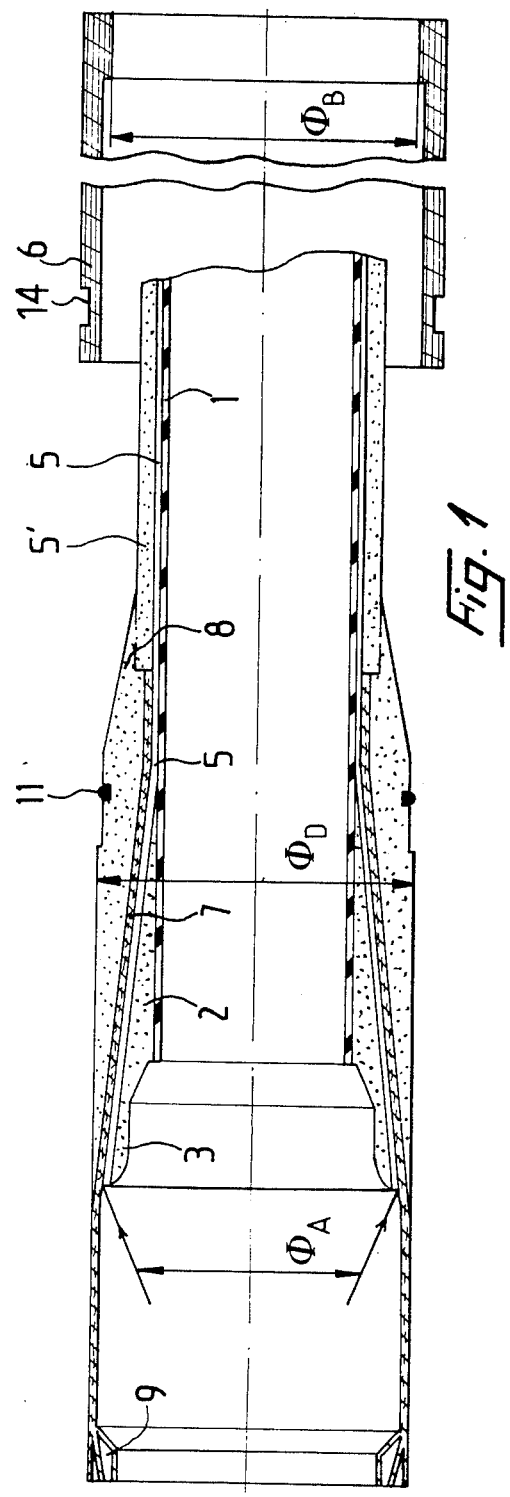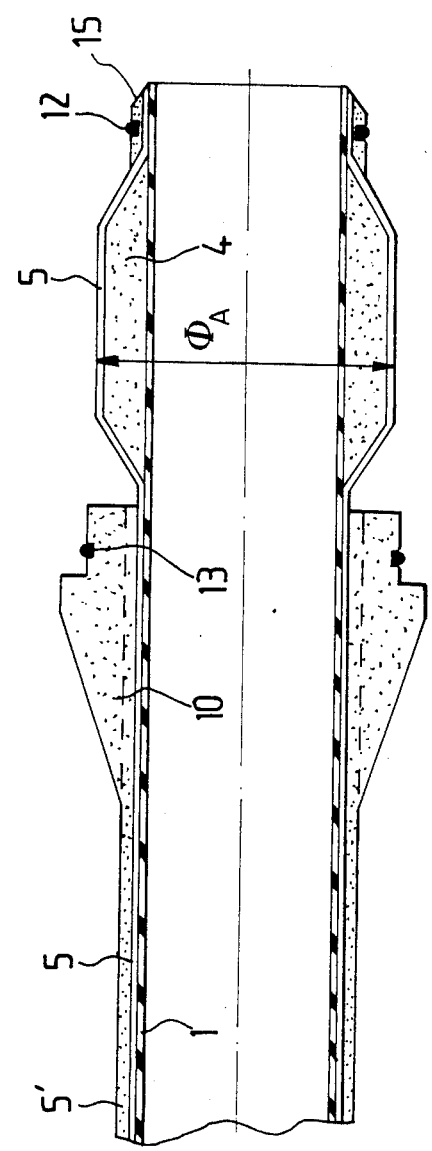

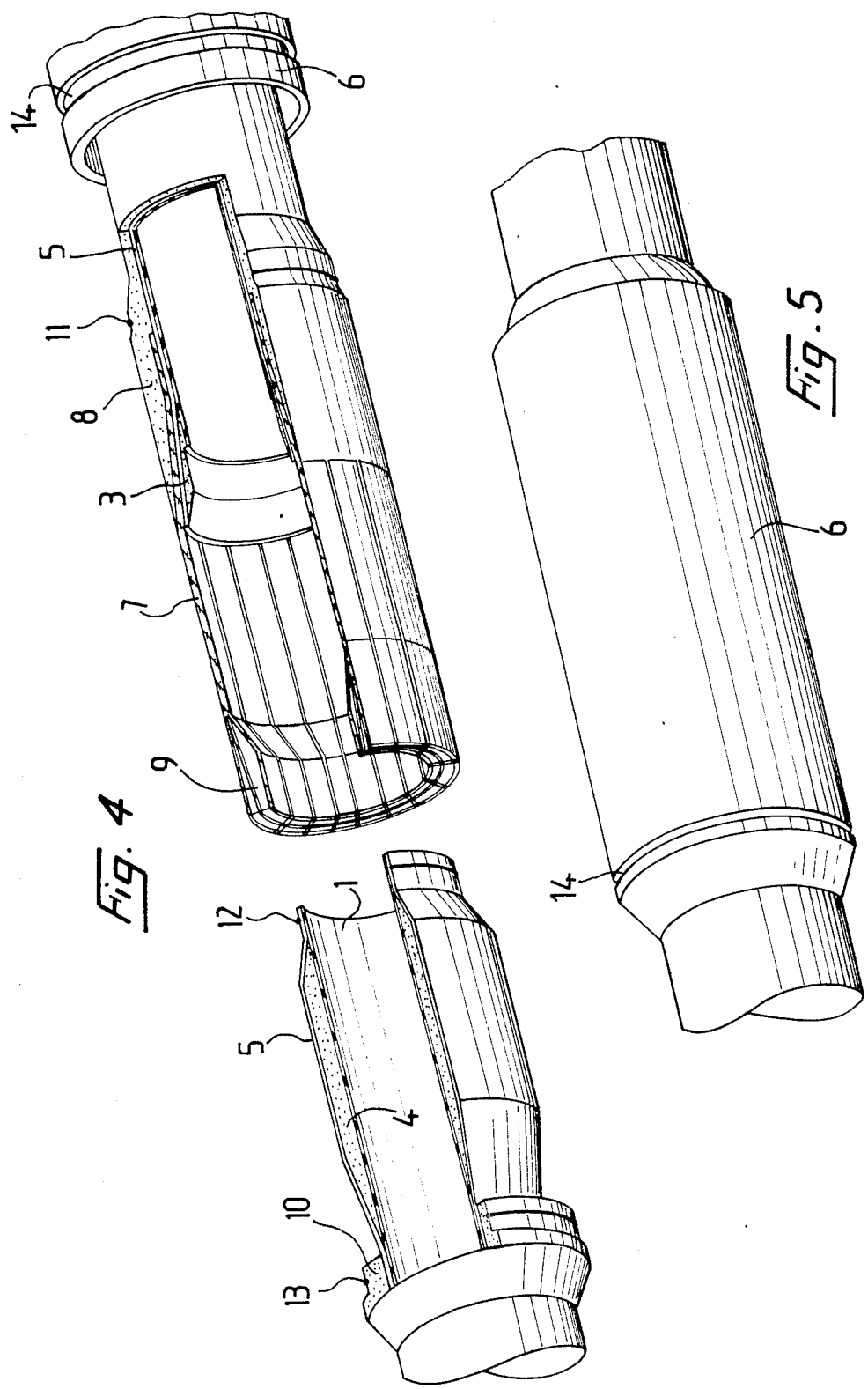

METHOD OF FORMING A COMPOSITE MATERIAL TUBE CONNECTION AND A CONNECTION DEVICE COMPRISING APPLICATION THEREOF

The invention relates to a method of forming a composite material tube connection, which is itself made from a composite material without any metal part, as well as a connection device comprising application thereof.

Such composite materials are formed from fibers of any kind such as glass fibers or carbon fibers or aramid fibers bonded with resins, for example epoxy resins. The composite material tubes formed by filament winding have undoubted advantages particularly because of their fatigue and corrosion resistance, their lower weight and their cost. They lend themselves particularly well to uses in the fields such as offshore oil prospecting or the use of energy of geothermic origin. In this latter case particularly, the corrosive medium formed by the hot salt water taken at a great depth raises important problems of resistance to corrosion of the different elements forming the installation, for example of the tubes, the pumps etc. . . . Among these elements, the pump suspension tubes raise a particular problem on account of the pressure level reached and of the temperature to which they are subjected, in addition to the corrosive environment in which they are exposed. In addition, such tubes must be able to be assembled and uncoupled periodically for maintenance of the pump. Thus for this kind of use the choice turns to composite material tubes which advantageously replace the special stainless steel tubes used up to now whose cost is all the higher since a rubber coating is required for extending the useful life thereof and whose weight makes handling thereof difficult and requires heavy equipment for positioning. However, the main problem raised by such composite material tubes resides in their connection system.

Two types of connection are known for composite material tubes formed by filament winding.

First of all, connections including a metal end piece added to or incorporated in the winding. It is known that such end pieces must be bonded or integrated with their support extremely solidly so as to resist severe stresses and particularly traction forces which are all the higher the deeper the drilling. The methods of fixing such metal elements on composite material tubes include a succession of technical operations which go for example from a first step for coating the metal end piece with a bonding agent followed by drying and application of an elastomer, to a second step for vulcanizing the elastomer and polymerizing the bonding agent, then to bonding of the not yet polymerized composite material followed by new polymerization of the tube thus formed.

This technique which proves effectively satisfactory for obtaining connected tubes, resisting high traction forces, remains nevertheless delicate and costly to put into practice. In addition, in order to limit the risks of corrosion, it is imperative to use special stainless steel end pieces of a high cost price.

It seems preferable consequentially to use a second type of connection called "all composite" without any metal part. It is known that up to the present such connections applied to composite material tubes were formed by threads machined in an extra thick composite or pure resin portion. But for the above mentioned uses, the threaded connections are insufficient and handling relative to tightening of the tubes is not readily acceptable.

An aim of the present invention consists, therefore in a method for forming a composite material tube connection which is easy to produce and overcomes the above mentioned drawbacks inherent in the methods using a metal end piece or in simple screwing systems.

An object of the present invention is an "all composite" connection device provided more especially for pump suspension tubes, formed of a male-female connection for joining two tubes together by simple fitting one in the other. In connection with this fitting system, a type of connection is known to be used for example in the field of flexible pipes operating at low pressures, which includes essentially a female end piece formed of several tongues forming a cylindrical sleeve which snap fit by resilient deformation in a groove provided on the male end piece, and a sliding locking ring intended to lock this snap fitting. Such known connections made from a molded material or from a metal form independent elements to which the ducts or pipes in question are connected. For connecting together composite material tubes complying with the above mentioned requirements, it is obviously not possible to add to these tubes end pieces of such a nature even if they are themselves made from a composite material. The invention consequently provides simultaneously the fabrication of the conduit part of a tube as well as male and female end pieces provided respectively at each of its ends, through a succession of general winding operations on the tube assembly, of special winding operations at the ends so as to form the extra thick portions forming the snap fit members, and introduction of complementary elements for locking the snap fit members, so as to obtain end pieces integral with the tube.

The method of the invention includes the following steps:

(a) a rubber sealing skin, whose vulcanization will take place simultaneously with polymerization of a composite, is formed on a mandrel by winding strips, (b) a composite material insert adapted to formation of the male end piece and an insert adapted to formation of a female end piece are wound circumferentially on the upper skin respectively at each end, (c) fibers are wound continuously over the whole length of the tube and at the ends above the inserts, (d) an external sleeve previously formed separately on a mandrel by circumferential winding of fibers is introduced over the conduit part of the tube, (e) formation of the female end piece is finished by binding over its insert with a new circumferential winding of strips previously formed by winding fibers and longitudinal cutting, (f) the formation of the male end piece is finished by forming an abutment heel in the vicinity of its insert by circumferential winding of fibers, (g) the whole is polymerized, (h) complementary machining of the grooves of the joints is carried out.

The following description of one embodiment taken by way of non limitative example, will clearly show the particular characteristics and advantages of the invention and will give a better understanding of the invention. Reference is made to the accompanying drawings which show:

FIG. 1: a sectional view of the end of the tube with a female end piece,

FIG. 2: a sectional view of the other end of the tube with a male end piece,

FIG. 3: a partial sectional view of two tube ends connected together,

FIG. 4: a perspective view with parts cut away of the male and female end pieces of two tubes before connection thereof and, FIG. 5: a perspective view of two connected tube ends.

Referring to FIGS. 1 and 2, the first steps of forming a tube and its end pieces will be described. On a mandrel, not shown, strips are wound forming the rubber tubular skin 1 which will be vulcanized at the time of polymerizing the composite. Then, on each end of the tube, fibers are wound circumferentially, the superimposition of which will provide the extra thickness forming the fastening members for the male end piece and the female end piece. The insert 2 thus formed, shown in FIG. 1, has a conical profile whose base 3 extends beyond the end of the tube. This part is obtained by winding on a mandrel, not shown, which gives it the inner shape shown in the drawings. Insert 4, shown in FIG. 2, has a trapezoidal profile. It is formed in the edge zone of the end of the tube.

Over the whole length of the tube, including above the end inserts 2 and 4, fiber layers 5 are wound continuously, called longitudinal layers for the angle of the fibers with respect to the local generatrix of the tube is less than or equal to 20°. The conduit part of the tube is then completed by a circumferential winding 5' of fibers.

Before going further in the formation of the end pieces, a sleeve 6 is introduced over the tube whose inner diameter $\phi B$ is greater than the outer diameter $\phi A$ of winding 5 in line with the inserts 2, 4 and less than the outer diameter $\phi D$ of the finished female end piece. Sleeve 6 has been previously formed separately on a mandrel by circumferential winding of fibers, for example carbon fibers.

Then, over the inset 2 of the female end piece are positioned strips 7 which extend beyond base 3 of the insert and are bound thereon by a new circumferential winding 8. These strips are also previously formed separately on a mandrel by circumferential winding of fibers. The winding angle $\alpha = 0°$ between the direction of the fibers and the axis of the tube causes them to work in the direction of the stress and confers on these strips a high tensile strength. Their end 9 is further formed by a stack of longitudinal layers and fabric covering. After polymerisation the strips are cut longitudinally by means of a diamond tipped wheel. As can be seen more clearly in FIG. 4.

On the end of winding 5' on the male end piece side another layer is formed by a circumferential winding of fibers 10 forming a heel and stop for the sleeve and providing a sealing function as will be seen further on. The outer diameter of this heel 10 is equal to the outer diameter $\phi C$ of sleeve 6. Then, at the end of the male end piece, an extra thickness is formed by circumferential winding 15 so as to be able to machine the seal groove 12.

With the structure of the tube ends thus formed, as can be seen in FIGS. 1 and 2, the whole of the tube may then be polymerized.

The subsequent operation before removing the mandrel consists in machining grooves for the seals. A first annular seal 11 will be placed in a groove provided in the circumferential winding 8 of the female end piece. On the male end piece, an annular seal 12 is provided at the end of the tube in a groove formed in the circumferentially wound extra thick portion 15. Another annular seal 13 is located in a groove in the heel 10.

FIG. 4 shows two tube ends thus formed ready to be connected together and FIG. 5 shows two connected tubes. These tubes are presented vertically in the bore hole, with the male end piece upwards. The female end piece of the upper tube is presented above the male end piece then lowered until the strip 7, after passing beyond the insert 4 of the male end piece because of their elasticity, snap back on this latter when their end 9 is housed in the annular space between insert 4 and heel 10. Then sleeve 6 is slid downwards so as to hold the strips clamped together. The sleeve made for example from carbon fibers is self clamping at temperature because of the very low coefficient of heat expansion of the material with respect to the coefficient of heat expansion of the fibers, for example glass fibers, forming the end pieces of the tubes. Simultaneously, it provides sealing on the O seals 11 and 13. It is lowered until it comes into contact with heel 10 which will serve as protector during lowering of the tubes into the well. During raising of the tubes, a possible hang up will result in applying the sleeve in the closed position on heel 10. A groove 14 may be formed in sleeve 6 on the outside to allow engagement of positioning and removal tools if required. Seals 11 and 13 provide then sealing to external fluids whereas seal 12 provides internal sealing.

With this method which allows end pieces to be obtained forming an integral part of the tube, and consequently themselves made from a composite material, tube connections may be made which are reliable, light and resistant to corrosion and which may also be readily assembled and uncoupled periodically.

The embodiment has been described relatively to a tube having a male end piece and a female end piece. A variant coming within the scope of the present invention would consist in providing on the tubes, either two male end pieces or two female end pieces. Another variant would consist in winding layer 5 at the angle $\alpha = 0°$, which by extending the layer above the end 3 of insert 2, would allow strips to be cut longitudinally in said layer 5, and thus would avoid separate fabrication of strips 7.

I claim:

1. A method of forming a composite material tube connection, wherein a conduit part of said tube having end pieces selected from the group consisting of male end and female end pieces, is fabricated by a succession of general winding operations on the whole of the tube, and a particular winding operation at the ends for the members of a female end piece snap fitting on a male end piece, comprising the following steps:
    (a) a rubber skin (1), which will be vulcanized simultaneously with the polymerization of the composite, is formed on a mandrel by winding steps,
    (b) a composite material insert (4) adapted for the formation of a male end piece and an insert (2) adapted for the formation of a female end piece are wound circumferentially on the rubber skin respectively at each end,
    (c) fibers (5) are wound longitudinally continuously over the whole length of the tube and at the ends above the inserts (2) and (4), (d) fibers (5') are wound circumferentially over the conduit part of the tube, (e) an external sleeve (6) previously formed separately on a mandrel by circumferential winding of fibers is introduced on the conduit part of the tube, (f) the formation of the female piece is finished by binding above its insert (2) a new circumferential winding of strips (7) previously formed by winding fibers and longitudinal cutting, (g) formation of the male end piece is finished by forming a stop heel (10) in the vicinity of its inserts and an extra thick portion is formed by the circumferential winding of fibers, (h) the whole is polymerized, (i) complementary machining of a groove for receiving annular seals is accomplished.

2. The method according to claim 1, characterized in that the insert (2) of the female end piece has a conical profile whose base (3) extends from the end of the tube.

3. The method according to claim 1, characterized in that the insert (4) of the male end piece is formed in the edge portion of the end of the tube and has a trapezoidal profile.

4. The method according to claim 1, characterized in that the sleeve (6) is previously formed from fibers having a lower coefficient of heat expansion than that of the fibers forming the end pieces.

5. The method according to claim 1, characterized in that the end (9) of the strips is formed of a stack of longitudinal layers at $\alpha = 0°$ and of covering fabrics.

6. The method according to claim 1, characterized in that the outer diameter of the stop heel (10) is equal to the outer diameter $\phi C$ of the sleeve (6).

7. The method according to claim 1, characterized in that a groove is machined in the circumferential winding (8) of the female end piece for positioning the annular seal (1).

8. The method according to claim 1, characterized in that a groove is machined in a circumferentially wound extra thick portion (15) of the male end piece for positioning the annular seal (12).

9. The method according to claim 1, characterized in that a groove is machined in the heel (10) of the male end piece for positioning the annular seal (13).

10. A connecting device according to claim 9, characterized in that a groove (14) is formed on the outside of the sleeve (6) for allowing fitting of positioning and removal tools.

11. A connection device for composite tubes having fiber reinforced resin conduit parts, comprising:

(a) a female end piece comprising insert (2) disposed over an end portion of said conduit part, longitudinal fiber layers (5) wound around said insert (2) at an angle of less than or equal to 20° to the generatrix of the conduit part, strips (7) disposed over said fiber layers (5) at an angle of 0° to the generatrix of the conduitpart and terminating in a thickened end portion directed inwardly, said strips being bound to said longitudinal fiber layer by a circumferential winding;

(b) a male end piece comprising;

an insert having a trapezoidal profile disposed circumferential at the edge zone of said conduit part and a heel and stop disposed circumferentially about said conduit part inwardly from said insert;

(c) annular grooves formed in an outer surface of said circumferential winding of said female end piece, in the terminal portion of said male portion and in said heel portion;

(d) seals disposed in said grooves; and (e) a sleeve slidably disposed between said male and female end pieces having an inner diameter greater than the outer diameter of said female portion but less than the greatest diameter of said male portion heel, said sleeve portion being a means to lock the terminal portion of said female end portion behind said insert of said male end portion after said male end portion has been inserted into said female end portion, while simultaneously engaging said seals of said stop portion and said circumferential winding.

* * * * *